US005179771A

United States Patent [19]

Hebsgaard

[11] Patent Number: 5,179,771

[45] Date of Patent: Jan. 19, 1993

[54] APPARATUS FOR ASSEMBLING SLATS OF VENETIAN BLINDS

[75] Inventor: Jens O. Hebsgaard, Odense, Denmark

[73] Assignee: A/S Chr. Fabers Fabriker, Ryslinge, Denmark

[21] Appl. No.: 768,628

[22] Filed: Oct. 25, 1991

[30] Foreign Application Priority Data

Apr. 25, 1989 [DK] Denmark ............................ 1992/89

[51] Int. Cl.[5] ............................................ B23P 19/04

[52] U.S. Cl. ...................................... 29/24.5; 29/433; 29/241

[58] Field of Search ............. 29/24.5, 433, 241, 281.1, 29/281.4

[56] References Cited

U.S. PATENT DOCUMENTS 4,073,044 2/1978 Edixhoven .......................... 29/24.5
4,188,693 2/1980 Edixhoven .......................... 29/24.5
4,516,300 5/1985 Gaillard et al. ...................... 29/24.5
4,958,421 9/1990 Spangenberg ....................... 29/24.5

FOREIGN PATENT DOCUMENTS 301042 5/1968 Sweden .
323787 5/1968 Sweden .

*Primary Examiner*—Timothy V. Eley
*Attorney, Agent, or Firm*—Jacobson, Price, Holman & Stern

[57] ABSTRACT

A machine for production of finished lath packs for Venetian blinds, which have holes at the ends for draw cords and ladders consisting of bands or strings, every cross band of which carries a lath, and where two neighboring cross bands of a ladder are placed on each side of the draw cord passed through the holes. The machine has a mechanism which inserts laths at each ladder, a mechanism which lifts the inserted lath and the ladders as well as devices to retain the raised lath. Each lifting mechanism has a carrier with a slit through which the ladder stretches and, on both side of the slit, carrier faces sloping away from each other for an inserted lath. The carrier can tilt in such a way that the carrier faces support the laths alternately. The carriers are tilted synchronously with the movement of the feed mechanism. The carrier is thus used also for positioning the ladder with the consecutive cross bands placed on one and the other side alternately of the draw cord.

2 Claims, 2 Drawing Sheets

APPARATUS FOR ASSEMBLING SLATS OF VENETIAN BLINDS

BACKGROUND AND SUMMARY OF THE INVENTION

The present invention relates to a machine for production of finished packs of Venetian blind laths of the kind described in the introduction to claim 1.

A machine of the said kind is known from U.S. Pat. No. 4,516,300 where the ladder from a ladder supply is guided through a guide mechanism located under the inserted lath. In a further not specified manner this guide mechanism can be tilted from one end position to another whenever the inserted lath and the ladder are lifted so that the ladder cross band is placed on one and the other side alternately of the draw cord.

Designing the device according to the invention as described in claim 1 has the result that the same machine element, i.e. the carrier, is utilized for both lifting the inserted laths and guiding and placing the ladder correctly, i.e. with the consecutive cross bands placed on one and the other side alternately of the draw cord.

The devices used to swing the carriers synchronously with the insertion of laths may, for example, include drives activated by a switch mounted in the feed path for the laths. However, a simpler and more dependable design is shown in claim 2.

BRIEF DESCRIPTION OF DRAWINGS

In what follows, the invention is described further in connection with the drawing where.

DESCRIPTION OF PREFERRED EMBODIMENT

Figure 1:
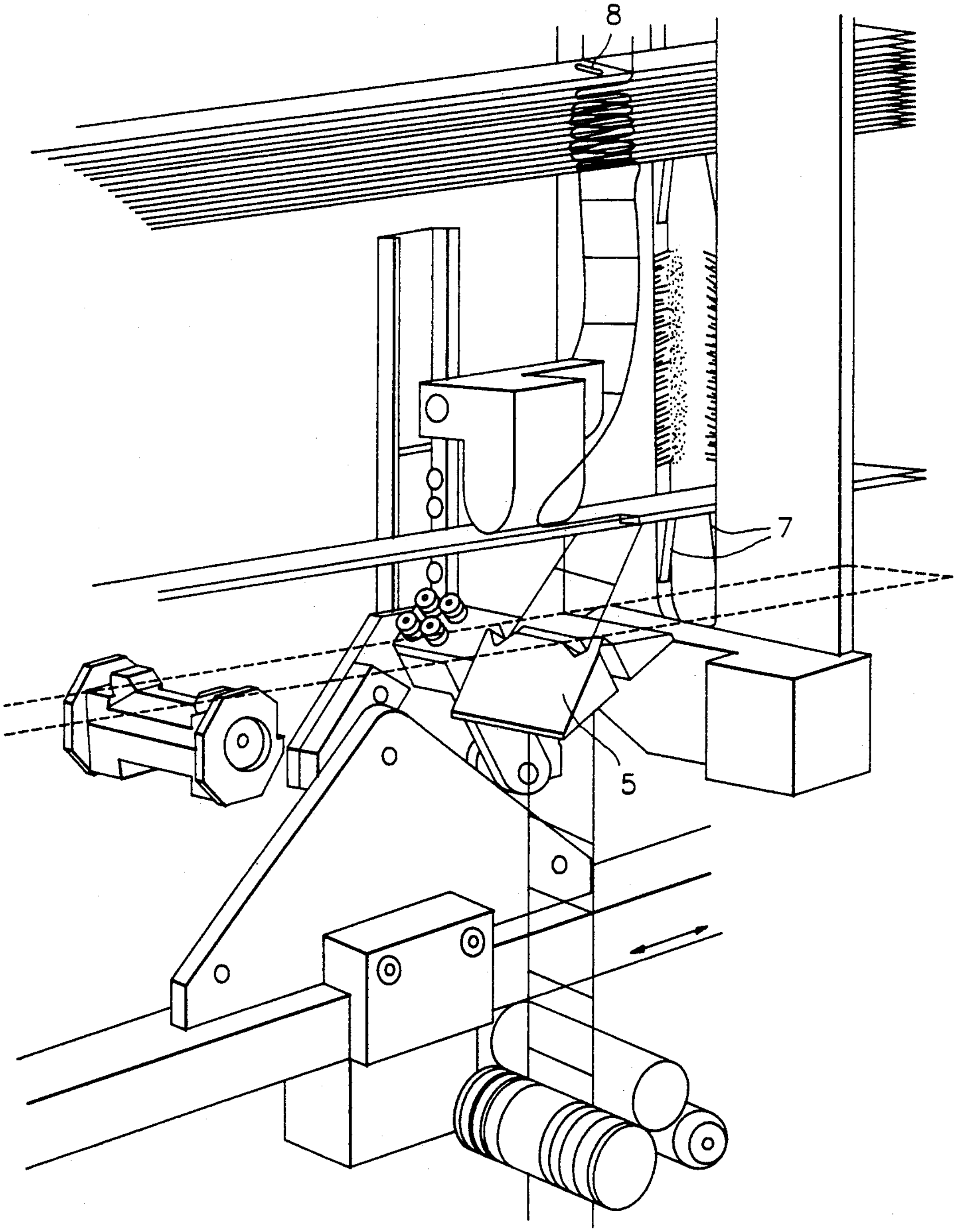
FIG. 1 shows the parts of a machine for production of Venetian lath blinds after insertion of a lath, which parts are important to the invention, and FIG. 2 the same parts, but after insertion of the following lath.
Figure 2:
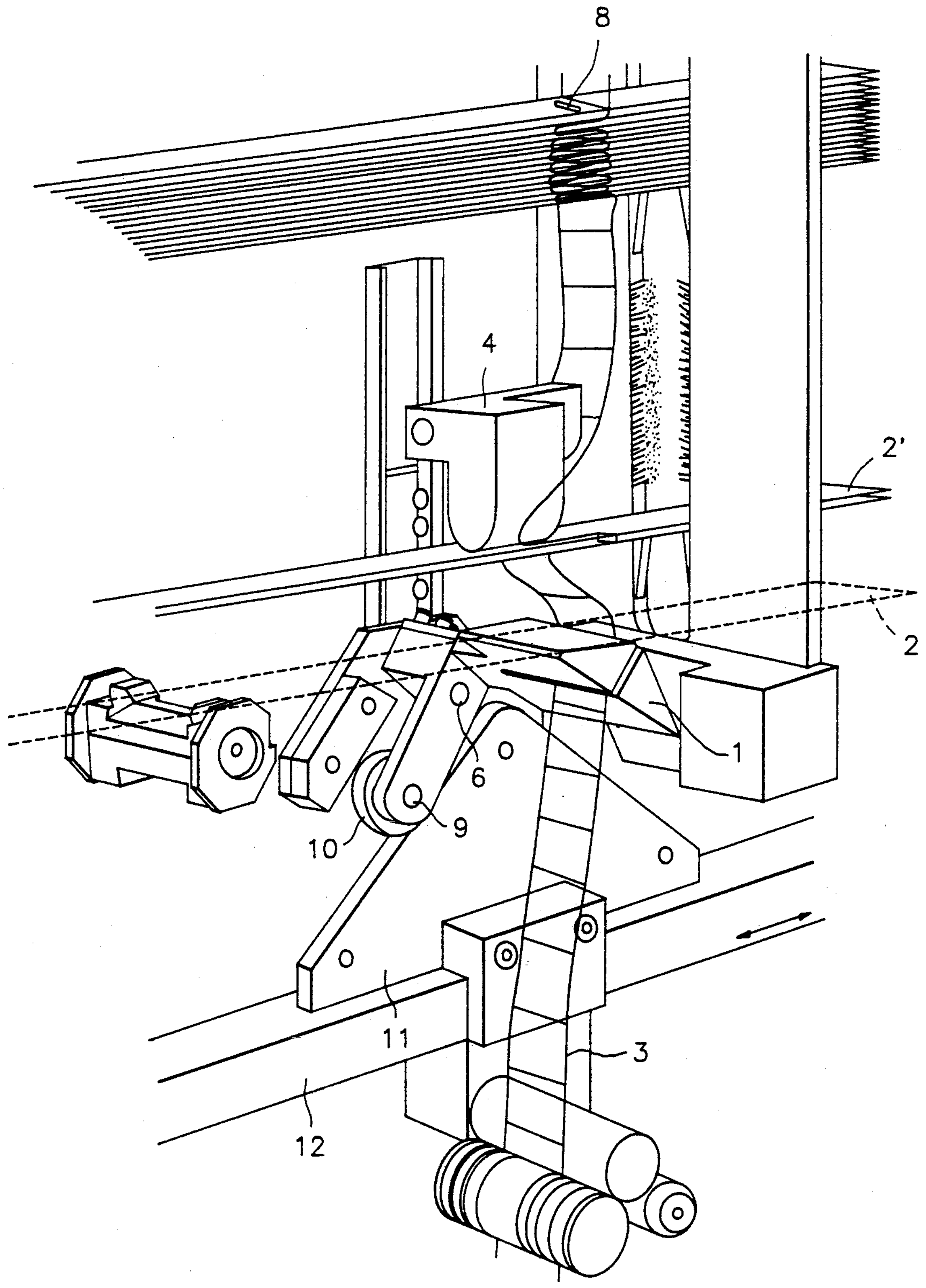

The machine shown on the drawing includes a number of identical work stations, viz. a station for each ladder band with which the Venetian lath bland is to be provided depending on the dimensions of the laths.

Each work station has carrier 1 to support the last inserted lath 2 in a known way which is irrelevant to the invention. The carrier 1 has a slit through which a ladder 3 consisting of bands or strings stretches downward from previously inserted laths 2' and/or a separate holder 4 to a ladder supply not shown. On both sides of the slit the carrier 1 has carrier faces 5 which slope away from each other on both sides of the slit and turn on an axis 6 stretching across the lower side of the inserted lath 2. The carrier 1 can be swung between a position in which one carrier face 5 supports a lath 2 and another position in which the other carrier face supports a lath. The swing is effected in a way described later so that the two carrier faces alternately support consecutive laths. The carrier 1 lifts the lath 2 so that it is gripped by pawls 7 in a magazine, and when the carrier moves down it is turned because of the special design of the guide plate 11. On account of the swing the suspended ladder is moved at the same time so that the cross bands are on one and the other side alternately of a punched hole 8 in laths 2,2'.

A downward arm 9 is fixed to the carrier 1 of the shown embodiment. A roller 10 which works together with a guide plate 11 is fixed to the lower end of the arm. The guide disc is fixed to a push bar 12 which can reciprocate synchronously with the feed mechanism for laths 2,2', not shown. The guide plate 11 is designed in such a way that the carrier 1 is swung as described above whenever a lath 2 is inserted and supported by a carrier face 5.

I claim:

1. A machine for production of finished lath packs for Venetian lath blinds, the superjacent laths (2, 2') of which have punched holes (8) at least at the ends for draw cords and ladders (3) consisting of bands or strings, every cross band of which carries a lath, and where one of two neighboring cross bands of a ladder is placed on one side while the other is placed on the other side of a draw cord passed through the punched holes (8), which machine has a feed mechanism which inserts laths (2) one by one over a cross band in a suspended ladder (3) and at each of the suspended ladders a lifting mechanism (1) which lifts the inserted lath and the ladder (3) so that a following lath is inserted over a following cross band of the ladder, the machine also having devices to retain the raised lath, characterized in that each lifting mechanism has a carrier (1) with a slit through which the suspended ladder (3) stretches and, on opposite sides of the slit, oppositely inclined carrier faces (5) for engaging an inserted lath (2), which carrier can turn on an axis (6) stretching across the lower side of the inserted lath between one end position where one carrier face supports the lath and another end position where the other carrier face supports the lath, the machine also having a mechanism (9-12) to swing the carrier (1) from the one end position to the other end position synchronously with movement of the feed mechanism.

2. A machine as claimed in claim 1, characterized in that a downward arm (9) and a curve roller (10) are fixed to each carrier (1) and that devices swinging by the carriers include a push bar (12) reciprocated by the feed mechanism under the inserted laths (2), to which push bar guide plates (11) are fixed which work together with each curve roller.

* * * * *